April 18, 1950     D. J. GREILING     2,504,520
SWEAT-PREVENTING MEANS FOR FREEZING CASES
Filed Sept. 16, 1947     2 Sheets-Sheet 1

INVENTOR.
David J. Greiling
BY *Owen & Owen*
ATTORNEYS

April 18, 1950  D. J. GREILING  2,504,520
SWEAT-PREVENTING MEANS FOR FREEZING CASES
Filed Sept. 16, 1947  2 Sheets—Sheet 2

INVENTOR.
David J. Greiling
BY Owen & Owen
ATTORNEYS

Patented Apr. 18, 1950

2,504,520

UNITED STATES PATENT OFFICE 2,504,520

SWEAT-PREVENTING MEANS FOR FREEZING CASES

David J. Greiling, Kendallville, Ind., assignor to McCray Refrigerator Company, Kendallville, Ind., a corporation of Indiana Application September 16, 1947, Serial No. 774,233

18 Claims. (Cl. 62—89.6)

This invention relates to freezing cases, and particularly to those of the type having overhanging ledges in the upper part of the compartment in which the foods are kept in a frozen state.

In open-top freezing cases commonly used in stores for the display of foods, it is customary to provide an overhanging structure in the upper rear portion of the case which forms a transparent sign for display matter in advance of lamps for illuminating same and mounted interiorly of the structure. These structures may also be provided in front with displays, such, for instance, as price designations, etc.

A serious objection to the use of such cases is the sweating that ordinarily occurs in the upper portion of the open-top freezing chamber. If an overhanging ledge is present in the case, the problem is aggravated inasmuch as the continued condensation of moisture will result in drippings onto the food packages in the freezing area below. If this overhanging portion of the case can be kept at a temperature above the atmospheric dew point, no condensation will occur. In warm humid locations, the dew point is relatively high and a certain amount of heat conduction and convection, which is inevitable in open-top freezer cases, results in sweating around the top.

The primary object of the present invention is to obviate these difficulties by the provision of simple and efficient means, in connection with cases of this character, for maintaining the upper portions of the freezing chamber, and particularly overhanging portions thereof, at a temperature above the atmospheric dew point so that no condensation will occur.

Another object of the invention is to prevent the accumulation of condensation or frost on the display windows, price cards, or the like, in the upper portion of the freezing chamber.

The invention is fully described in the following specification, and one embodiment thereof illustrated in the accompanying drawings, in which—

Figure 1:
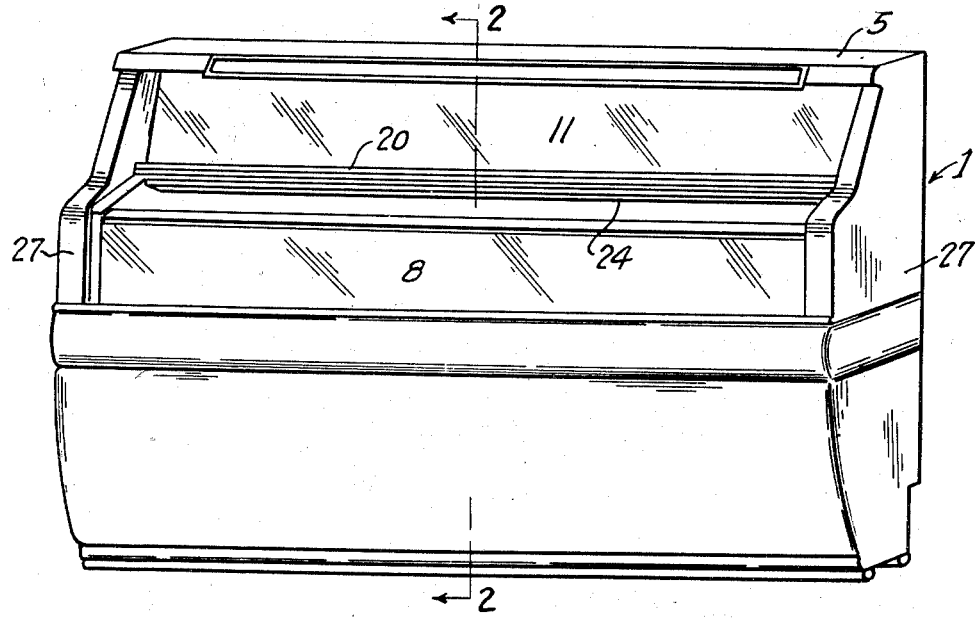
Figure 3:
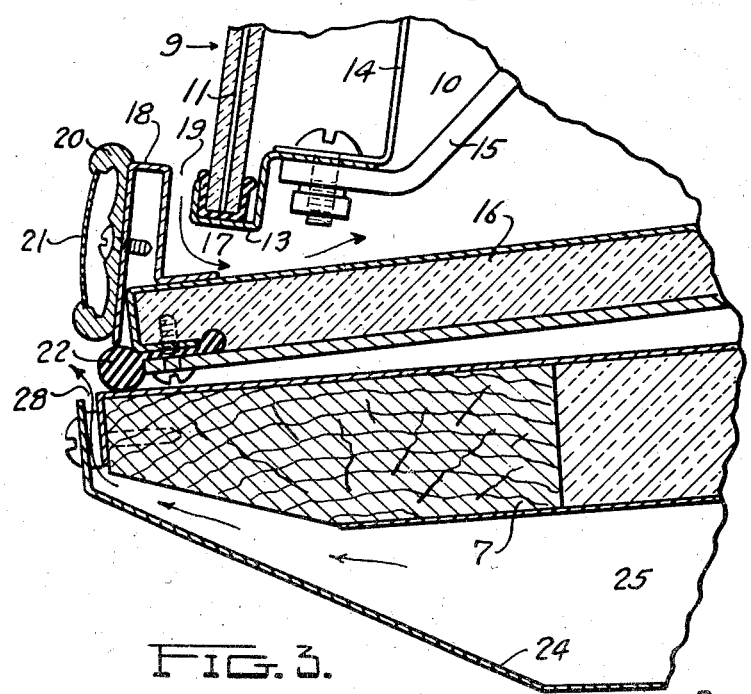
Figure 4:
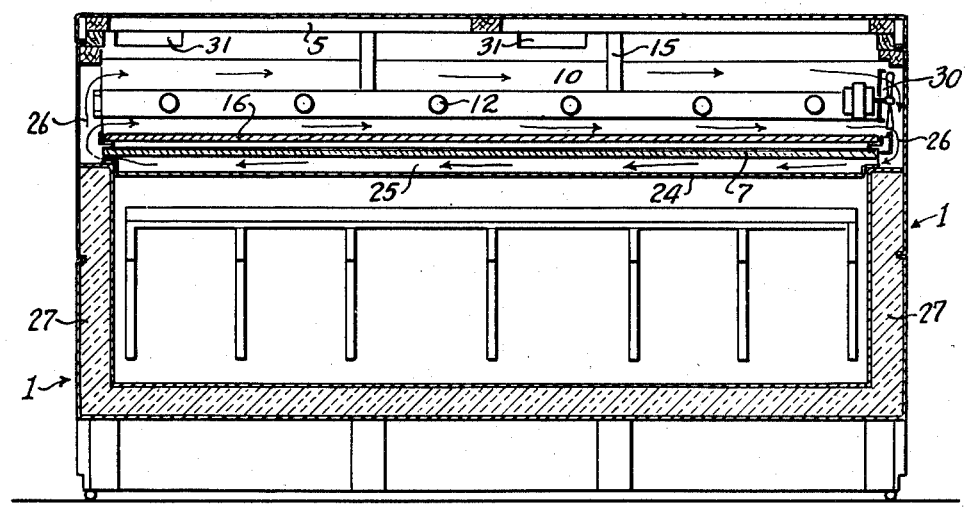
Figure 2:
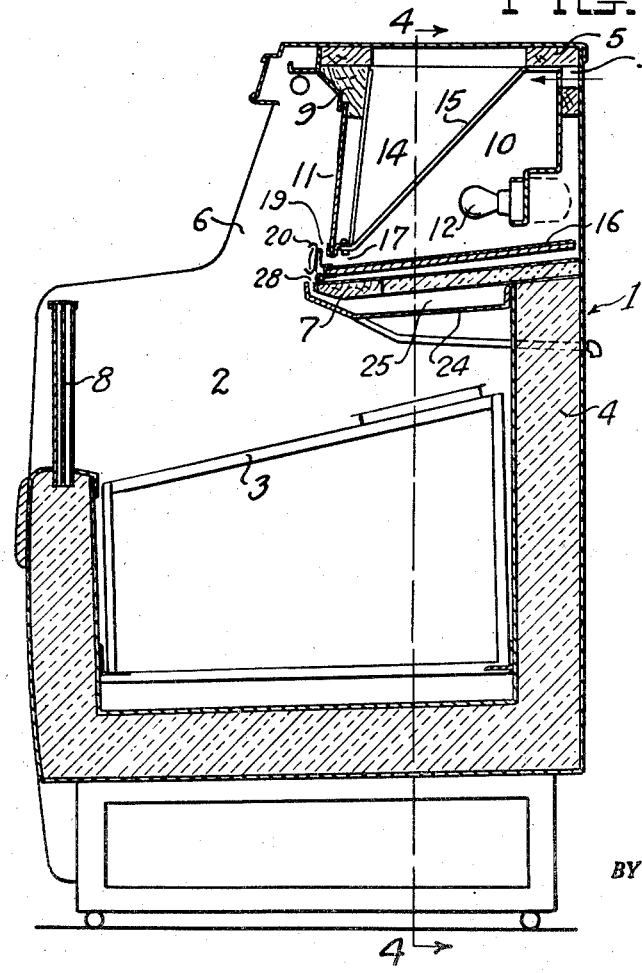

Fig. 1 is a front perspective view of the case; Fig. 2 is a central vertical cross-section on the line 2—2 in Fig. 1; Fig. 3 is an enlarged fragmentary portion of the section shown in Fig. 2, and Fig. 4 is a longitudinal vertical section of the case on the line 4—4 in Fig. 2.

Referring to the drawings, 1 designates a freezer case having an open-top freezing chamber 2 in which foods are displayed and the bottom of which, in the present instance, is provided with cold plates 3 the chilling of which is effected in any suitable manner, as well understood in the art. The rear wall 4 of the case extends above the top of the freezing chamber 2 and has a top 5 extending forward therefrom above the top of said chamber and to the upper rear edge of the opening 6 through which access is had to the interior of the freezing chamber.

A ledge or portion 7, in the present instance, projects forward from the rear wall 4 in vertically spaced relation to the top 5 and adjacent to the level of the top of the front wall 8 of the chamber 2. This ledge is preferably slightly forwardly declined and cooperates with the top 5, the rear wall 4 and the front vertically disposed partition 9 to form an air conduit 10 in the upper rear portion of the case. The partition 9 preferably comprises a glass sign plate 11 that is illuminated from within the chamber 10 by a series of electric lamps 12 to display matter on the plate.

The lower edge of the glass plate 11 is shown as supported, in the present instance, by a channeled bracket 13 suspended above the outer edge portion of the bottom ledge 7 in vertically spaced relation thereto by vertical hangers 14 and diagonal hangers 15 depending from the top 5.

A bottom plate 16 of heat insulating material is mounted on the ledge 7 for free insertion and removal through the space 17 between the lower edge of the partition 9 and said ledge, and when in inserted position is spaced a distance from said partition to provide a narrow air inlet passage to the lower interior portion of the conduit 10. When the plate 16 is in position, an upstanding bracket 18 on its front edge extends up above the lower edge of the partition 9 slightly in advance thereof to entirely hide the space 17 from front view and to provide a vertically disposed narrow passage 19 thereto, as best shown in Fig. 3. On the front of the bracket 18 is mounted a channeled molding or holder 20 for a series of food price tags 21. The lower front edge of the plate 16 is preferably provided with a gasket bead 22 that bears at its under side against the top surface of the ledge 7 and is forced by such bearing against the lower front edge portion of the bracket 18. While the plate 16 carries the price tag molding 20, it serves primarily as a cover for the compartment 2 and may be drawn out for this purpose.

On the under side of the ledge 7 is attached a member 24 forming with the ledge an air conduit 25 the entire length thereof, which conduit is open at its ends to the respective ends of the conduit 10 through passages 26 (Fig. 4) in the end walls 27 of the case. The front edge of the member 24 extends up in front of the ledge 7 in spaced relation thereto to form an upwardly directed narrow edge discharge slot 28 the entire length of the ledge. This directs a thin film of warm air from the conduit 25 up against the lower edge of the price card molding 20 and up around the front thereof for its entire length. It will be understood that the warm air from conduit 10 is circulated through conduit 25 and that this warms the partition 24 so that frost will not form on its under side.

In operation, the fan 30 causes a forced draft circulation of air at room temperature, or sometimes higher, due to the presence of the lighted lamps 12, through the conduits 10 and 25 and connecting passages. The flue 25 is not heat insulated from the subjacent freezing chamber 2, so that the bottom wall thereof is warmed sufficiently from the warm air passing thereover to prevent moisture from condensing thereon even under high humidity conditions. Also the air circulation through the conduit 10, which is at the suction side of the fan, will cause air in a thin stream to be drawn in through the slot or narrow passage 19, which combined with the warming of the glass from the warm air within the conduit 10 tends to keep the front of the partition 9 and its glass 11 free from accumulation of moisture condensation deposits. If there is no condensation and accumulation of moisture condensation deposits on these parts and surfaces, there will, of course, be no dripping therefrom onto the frozen food packages in the subjacent freezing area, thus avoiding a highly objectionable feature in the use of freezers of this type. It is also evident that with the use of this invention the accumulation of moisture condensation deposits on the illuminated display glass and the price cards and holder will not occur, so that a clear vision of such parts will exist at all times. If the lights are not turned on but the circulating fan is operating, the vents 31 tend to maintain the temperature of the circulating air essentially at room temperature which ordinarily is sufficiently high to prevent condensation of moisture on the overhanging parts in the case and the consequent dripping onto the frozen food packages in the freezing area below. The air conduit 10 takes in sufficient air through the slot 19 and the rear openings 31 to balance or compensate for the amount discharged from the conduit 25 through the slot 28. The air discharging from the slot 28 is at a temperature above that of the pool of air in the upper portion of the freezing compartment and this pool is not quiet but is disturbed by air currents in the store and by the customer's movements. The circulation of air through the conduit 10, 25, is sufficiently active that it is not appreciably refrigerated. It is found in practice that the cooling effect on partition 9 resulting from radiation from freezer plates 3 together with natural air convection currents is moderate and results in condensation thereon only in extreme humidity conditions. The price tag molding 20 has a greater tendency to show condensation because it is closer to the freezer plates 3. The velocity of air discharged through the slot 28 need not be great to accomplish its defrosting purpose. It need be just enough to form a protective film of slightly warmed air against the somewhat colder air convection currents normally moving in the open top of the case. Just as the velocity of air discharged at 28 is not great, so the velocity of air taken in at 17 is not great. The action is a leisurely air movement of slightly warmed air around parts which would otherwise be cooled below room temperature and hence may sweat when the room humidity is high.

It is found that if the fan 30 is not operating, condensation may occur inside the conduit 25. The drain illustrated in Fig. 2 from the conduit 25 is provided to carry off any condensation water that may thus occur. The fan is preferably wired with a manual control so that it would not need to operate all of the time. This condensation is not to be confused with that occurring on the under side of the member 24. With the present apparatus, the primary concern is with the condensation occurring on the under side of member 24 and to provide means for preventing such condensation. Actual field experience shows that the condensation here is quite common in humid weather.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a freezer case having a part overhanging a subjacent freezing compartment, means forming an air circulating conduit having a narrow slot positioned below said part to discharge a stream of air from the conduit up over said part to prevent condensation of moisture thereon, said conduit having connection with the atmosphere outside the case to maintain the circulating air at a temperature above the temperature of the air in said compartment.

2. An arrangement as called for in claim 1, together with means for creating a forced draft through said conduit and slot.

3. An arrangement as called for in claim 1, together with means in said conduit for heating air passing therethrough.

4. An arrangement as called for in claim 1, together with means for heating air in said conduit, and means for creating a forced draft through the conduit and slot comprising an electric fan.

5. In a freezer case, a structure overhanging a subjacent freezing compartment and forming an air conduit with a side discharge slot for directing a stream of air upward over a portion of the structure exposed to the freezing compartment to prevent condensation of moisture thereon, and means for maintaining the air in said conduit at a temperature above that in said compartment, and means for maintaining a draft flow of said air through the conduit and slot.

6. An arrangement as called for in claim 5 wherein the temperature maintaining means comprises electric lamps in the conduit.

7. An arrangement as called for in claim 5 wherein a portion of said conduit passes under the structure in substantially covering relation to its bottom to prevent condensation of moisture thereon, the bottom wall of said conduit portion that is exposed to the freezing compartment being thermal conductive to permit heating of its under surface by air within the conduit.

8. In a freezer case, a structure overhanging a subjacent freezing compartment and exposed at its bottom and front side thereto and having an interior bottom part, said structure also forming an endless air conduit extending lengthwise of the case both above and below said bottom and around its ends whereby air is circulated endwise around said bottom part, means for providing air in said conduit at a temperature above that in the compartment, said conduit having a slot at its front side for discharging air laterally from the conduit up over adjacent portions of the structure and in front of said front side.

9. In an open-top refrigerated display case, means in the upper portion of such case spaced rearwardly from its front side and having a front wall exposed to the interior of the case and a bottom overhanging a lower portion of the case and forming a conduit at the rear of the front wall and over said bottom, means below said bottom cooperating therewith to form a conduit at its under side with the bottom of said last conduit of thermal conductive material and exposed to the interior of the case, said conduits communicating at their ends around the ends of said bottom to provide an endless conduit, said lower means having provision at its front edge for discharging air therefrom up in front of the adjacent front parts of said first means, means for circulating air lengthwise through said conduits, and means for providing air in said conduits being at a temperature above that in the case so that the discharging air will prevent the condensation of moisture on a portion at least of the front side of said first means and on the exposed conduit forming bottom of said second mentioned means.

10. In an open-top refrigerated display case, a structure overhanging the interior freezing compartment of the case and exposed at its front side to said compartment, said structure having a bottom member and forming a conduit lengthwise around a predetermined portion of said member with the portion of the conduit below the member of shallow form and having provision at its front edge for the discharge of air therefrom up over a superposed front portion of the structure, the portion of the conduit above said member being of greater cross-sectional area than that below the member, means for creating a circulation of air lengthwise through said conduit and around said member, and means for warming the air in the conduit so that its temperature is above that in the interior of the case.

11. An arrangement as called for in claim 10, wherein the bottom wall of said conduit beneath said bottom member is of a thermal conductive nature so that the surface exposed to the case will be at a higher temperature than the temperature in the case.

12. In a freezer case of the open-top display type, a structure overhanging the freezing compartment of the case and forming an air circulating conduit throughout substantially the length of the case with a lengthwise extending slot in its front side for discharging air laterally from the conduit up over superposed portions of the structure front exposed to said chamber, said conduit having openings for the admission of atmospheric air thereto, and means for creating a forced air draft in said conduit lengthwise thereof.

13. An arrangement as called for in claim 12, together with air heating means in the conduit.

14. In a freezer case having a cold compartment, a structure in the upper portion of the compartment forming a longitudinally extending air conduit having a side exposed to the compartment and a bottom, said side having a longitudinally extending slot adjacent the front edge of said bottom for admission of air to the conduit, a member insertable through said slot immediately over said bottom and having a portion at its front edge exposed to said compartment, means forming a conduit below said bottom lengthwise thereof and having provision along its front edge to discharge air from said lower conduit up over the front of said member, said conduits having their ends connected to form a conduit lengthwise around a predetermined portion of said bottom, and means in the conduit to create a forced circulation therethrough, the discharged air being compensated for at least partially by air drawn in through said slot, and means for warming the air in the conduit to a higher temperature than the air in the compartment.

15. In a freezer case, a structure overhanging a subjacent freezing compartment and exposed at its bottom and front side thereto and having an interior bottom part, said structure also forming an endless air conduit extending lengthwise of the case both above and below said bottom part and around its ends whereby air is circulated endwise around said bottom part, said exposed bottom of said structure being of thermal conductive material, and means for providing air in said conduit at a temperature above that in the freezing compartment whereby said exposed bottom is maintained at a temperature above that in the freezing compartment by the air flowing through the conduit.

16. An arrangement as called for in claim 15 wherein the conduit has communication with the atmosphere to receive air therein at atmospheric temperature.

17. An arrangement as called for in claim 15 wherein means is provided in the conduit for heating the air therein.

18. In a case of the class described having an open-top refrigerated compartment, a hollow top structure exposed at its bottom to said compartment, said structure having a partition dividing the interior of the structure into upper and lower air passages with their adjustable ends combined to form an endless air directing conduit, means causing the air in the conduit to have a temperature higher than that in said compartment, the bottom of said structure forming the bottom of said lower passage and being thermal conductive, and means for creating a circulation of air through said conduit.

DAVID J. GREILING.

REFERENCES CITED

The following references are of record in the file of this patent:

UNITED STATES PATENTS

| Number | Name | Date |
|---|---|---|
| 2,229,569 | Hoesel | Jan. 21, 1941 |
| 2,241,853 | Hall et al. | May 13, 1941 |
| 2,241,854 | Hall et al. | May 13, 1941 |
| 2,462,705 | Abeling | Feb. 22, 1949 |
| 2,463,614 | Hardin | Mar. 8, 1949 |